United States Patent
Bernardini et al.

(10) Patent No.: US 11,653,621 B2
(45) Date of Patent: May 23, 2023

(54) CAGE FOR LABORATORY ANIMALS

(71) Applicant: TECNIPLAST S.P.A., Buguggiate (IT)

(72) Inventors: Pietro Bernardini, Casciago (IT); Simone Cassetti, Legnano (IT); Giovanni Malnati, Malnate (IT)

(73) Assignee: TECNIPLAST S.P.A., Buguggiate (IT)

( * ) Notice: Subject to any disclaimer, the term of this patent is extended or adjusted under 35 U.S.C. 154(b) by 25 days.

(21) Appl. No.: 16/663,961

(22) Filed: Oct. 25, 2019

(65) Prior Publication Data
US 2020/0128782 A1   Apr. 30, 2020

(30) Foreign Application Priority Data
Oct. 26, 2018 (IT) .................. 102018000009830

(51) Int. Cl.
*A01K 1/03* (2006.01)
*A01K 1/00* (2006.01)

(52) U.S. Cl.
CPC ............ *A01K 1/031* (2013.01); *A01K 1/0058* (2013.01)

(58) Field of Classification Search
CPC ................................ A01K 1/031; A01K 1/032
See application file for complete search history.

(56) References Cited

U.S. PATENT DOCUMENTS

| 3,537,428 A | 11/1970 | Montgomery |
| 4,781,084 A | 11/1988 | Steen et al. |
| 5,924,384 A * | 7/1999 | Deitrich ............... A01K 1/10 119/419 |
| 2006/0144342 A1 | 7/2006 | Iwaki et al. |
| 2011/0132272 A1 | 6/2011 | Gabriel et al. |
| 2015/0334986 A1 * | 11/2015 | Loyd ................ A01K 1/03 |
| 2016/0174519 A1 * | 6/2016 | Chang ............... A01K 1/03 |
| 2019/0014740 A1 | 1/2019 | Bernardini et al. |

FOREIGN PATENT DOCUMENTS

WO    2006138323 A2    12/2006

OTHER PUBLICATIONS

Italian Search Report for Italian appl'n No. IT 201800009830, dated Jun. 17, 2019.

(Continued)

*Primary Examiner* — Joshua J Michener
*Assistant Examiner* — Henry Hooper Mudd
(74) *Attorney, Agent, or Firm* — Amster, Rothstein & Ebenstein LLP

(57) ABSTRACT

A laboratory animal cage including a basin and a removable hood positioned which define an inner space that is closed and not accessible from the outside. The basin includes a flat bottom wall and sidewalls joined thereto, which define a first support edge. The hood is tray-shaped to define a second engagement edge and includes a main cover wall. Positioning the hood over the basin prevents the inner space from being accessed via the opposing first support edge and second engagement edge. With the bottom of the basin positioned on a support plane, the maximum distance between the first support edge and the support plane is 110 mm or less. Additionally, at least 50% of the inner surface of the bottom wall has a minimum height measurement to the inner surface of the hood of at least 127 mm, which is available for an animal.

13 Claims, 6 Drawing Sheets

(56) References Cited

OTHER PUBLICATIONS

Animalab: "EasyCage Disposable Caging for NexGen Mice IVC", (Jun. 2, 2018), XP002792140; URL:http://animalab.eu/products/easycagetm-disposable-caging-for-nexgen-mice-ivc.
Allentown: "One Rack, Two Cages"; vol. 16, No. 5; (Oct. 1, 2018); URL: http://digital.alnmag.com/animallabnews/october_2018?pg30#pg30.
CN Office Action dated Dec. 8, 2022 of corresponding CN application No. 201980062676.4, filed Oct. 25, 2019.

* cited by examiner

CAGE FOR LABORATORY ANIMALS

CROSS-REFERENCE TO RELATED APPLICATIONS

This application claims priority to Italian application no. 102018000009830, filed Oct. 26, 2018, the content of which is incorporated by reference in its entirety.

FIELD OF THE INVENTION

The present invention belongs to the field of housing for laboratory animals. The present invention in particular relates to a cage for housing laboratory animals. In detail, the present invention relates to a cage of the aforesaid type, modified according to an innovative solution so as to comply with the housing standards, while in any case generating a minimum volume. Still in greater detail, the present invention relates to a housing cage of the aforesaid type, characterized by reduced volume, in particular vertical volume, but in any case shaped so as to ensure the animals have a free height or free light in conformity with the standards and/or regulations for housing laboratory animals. The present invention also relates to a housing shelf including a plurality of cages of the aforesaid type, which are arranged in a vertical space, in particular in the vertical projection of the one positioned higher up, wherein a greater number of cages can be positioned on the shelf according to the present invention, vertical extension of said vertical space being equal.

BACKGROUND ART

To date, the use of cages, for example but not exclusively "ventilated" cages, namely those in which a flow of forced air taken from a main circuit is caused to circulate, is commonly used for housing laboratory animals such as for example, small rodents or the like.

The cages of known type, or at least those most commonly used, essentially comprise a basin or tray intended to contain the litter, and a hood or cover (also called top in the following), wherein access to the inner space defined by the basin-cover system is prevented with the cover positioned over the basin, and wherein if the cover is fastened to the basin (for example, by means of suitable closing means such as clips, handles or the like), the desired sealing is ensured due to a possible gasket positioned between the two elements so that the basin-cover system is adequately isolated from the outside environment, in particular from the animal housing where the animal housing users operate, thereby avoiding contaminations both of the animal housing towards the inside of the cage and from the inside of the cage towards the animal housing or external environment.

Moreover, a third component, simply called a lid and usually made of metal and shaped as a feeder intended to contain the feed in position which is accessible to the animals and so that the feed does not come in contact with the litter, is accommodated in the inner space defined by the basin-cover system. Finally, a bottle with drinking water may be provided inside the cage, or also outside the cage and resting on the cover.

It is also to be noted that in most cases, the housing cages are arranged or stored on housing shelves, which in turn are placed or stored in housing rooms according to predefined and variable layouts both according to the housing modes or methods and according to the shape of the rooms themselves, which often are obtained in underground laboratories and/or in research centers in general.

In particular, the cages are arranged in vertical spaces on the aforesaid housing shelves, and therefore in overlapping position, in order to increase, to the greatest extent possible, cage density, and therefore animal density, per square meter of floor surface in said housing rooms, wherein N−1 cages are positioned within the vertical projection of the end cage positioned higher up for a predefined number N of "overlapping" cages.

It is therefore to be deduced that the number of cages per square meter of surface is proportionately increased by increasing the number of cages arranged in overlapping position in each vertical space.

However, the number of cages which can be positioned in the same vertical space is limited by at least two factors.

A first limiting factor is due to the fact that in most cases, it is preferred to contain the height of the end cage positioned higher up within a maximum of about 2 meters so that all the cages, and in particular also the end one positioned higher up, are accessible and reachable by an operator also without the use of ladders or similar supports, the management of which would be at least problematic considering the limited spaces available, in particular in corridors between adjacent shelves.

Moreover, a second fact is due to the housing standards and/or regulations, which provide for a "vertical height" or minimum height of no less than 12 cm EU (5 inches USA, equal to 127 mm) to be made available for the animals for at least 50% of the floor surface defined by each housing cage, wherein it therefore can be appreciated that the simple reduction of the vertical volume (in height) of each cage in order to increase the number of cages which can be stacked and/or positioned in the same vertical space in overlapping position according to the above methods, would clash with the housing standards and/or regulations mentioned above.

It therefore is apparent that one of the drawbacks encountered in the housing cages according to the prior art relates to the impossibility, or at least difficulty, in dealing with the dual need for high-density storage and to ensure the free height or minimum height requested by the housing standards and/or regulations, in a satisfactory manner, wherein it is therefore the main object of the present invention to overcome or at least reduce or minimize the aforesaid drawback.

DESCRIPTION OF THE PRESENT INVENTION

In particular, a first object of the present invention is that of providing a cage for housing laboratory animals conceived so as to have a reduced or contained vertical volume, but in which the free height or minimum height available for the animals meets as well the requirements provided by the regulations, in particular at at least one portion of the floor surface which is no less than 50% of the total floor surface.

In detail, the objects of the present invention include providing a cage for housing laboratory animals conceived so as to have a reduced or contained vertical volume, but in which the free height or minimum height available for the animals simultaneously meets the requirements provided by the regulations, in particular at (in correspondence of) at least one portion of the floor surface which is no less than 50% of the total floor surface, and in particular even if an additional component is also accommodated inside the case, such as for example, a lid, in particular shaped as a feeder.

In greater detail again, it is an object of the present invention to provide a cage of the aforesaid type, with sufficiently reduced vertical volume so as to allow no less than twelve cages, preferably no less than thirteen cages, to be stored in a vertical space, for example defined by a shelf or rack, in overlapped position, still while complying with the housing regulations.

And again, a further object of the present invention is that of providing a cage of the aforesaid type, with sufficiently reduced vertical volume so as to allow no less than twelve cages, preferably no less than thirteen cages, to be stored in a vertical extension space no larger than 2000 mm, for example defined by a shelf or rack, in overlapped position, while always complying with the housing regulations.

Finally, it is a further object of the present invention to provide a housing shelf which allows no less than twelve cages, preferably no less than thirteen cages, in compliance with the housing regulations to be stored in a vertical extension space no larger than 2000 mm.

In consideration both of the drawbacks affecting the prior art and the preset objects, the subject of the present invention according to a first embodiment is a cage for housing laboratory animals, said cage comprising a basin and a hood which can be removably positioned over said basin, wherein, with said hood positioned over said basin, said hood and said basin define an inner space which is closed and not accessible from the outside, wherein said basin comprises a substantially flat bottom wall and a plurality of side walls, each joined to said bottom wall and reciprocally joined in pairs to define a first support edge, wherein said hood is in the shape of a tray to define a second engagement edge and comprises a main cover wall, wherein, with said hood positioned over said basin so as to prevent said inner space from being accessed, said first support edge and second engagement edge are opposed to each other; wherein, with said basin positioned over a support plane, the maximum distance between said first support edge and said support plane is smaller than or at most equal to 110 mm, wherein, at a portion of said bottom wall the surface of which is equal to at least 50% of the total floor surface of said bottom wall, the minimum vertical height which is available for said laboratory animals is no less than 127 mm.

According to one embodiment, with said basin positioned over said support plane and with said hood positioned over said basin so as to prevent the access to said inner space, the maximum distance between the outer surface of said main cover wall and said support plane is no greater than 143 mm.

According to one embodiment, said cage comprises at least one lid positioned inside said inner space, wherein the projection of said lid on said bottom wall at least partially falls within said portion of said bottom wall.

According to one embodiment, at the portion of projection of said lid on said bottom wall which falls outside said portion of said bottom wall, the minimum vertical height which is available for said laboratory animals is no less than 63 mm.

According to one embodiment, said hood comprises a plurality of side walls each joined to said main cover wall and reciprocally joined in pairs to define said second engagement edge and give said hood said tray shape.

According to one embodiment, said basin and said hood have a substantially rectangular plan shape.

According to one embodiment, said hood defines at least one depression adapted to accommodate a container, such as for example a container of drinking liquids, outside said space.

According to one embodiment, said hood defines at least two air intakes for introducing and discharging ventilated and/or forced air into and from said inner space, respectively.

According to one embodiment, said hood defines at least one grid-shaped portion.

The subject of the present invention also is a shelf for housing laboratory animals, wherein said shelf is shaped so as to contain a plurality of housing cages in a vertical space, wherein said shelf comprises at least ten housing cages according to one of the embodiments of the present invention, arranged in said vertical space so that the projections on a transverse plane of said at least ten cages substantially coincide, and wherein no portion of the end cage positioned higher up is further than 2000 mm from the ground.

Possible further embodiments of the present invention are defined in the claims.

BRIEF DESCRIPTION OF THE DRAWINGS

The present invention is further clarified below by means of the following detailed description of embodiments thereof depicted in the drawings, in which features and/or corresponding or equivalent component parts of the present invention are identified by the same reference numerals. It is in any case worth noting that the present invention is not limited to the embodiments described below and depicted in the drawings; contrarily, all those variants and/or modifications of the embodiments described below and depicted in the accompanying drawings, which are clear and obvious to those skilled in the art, fall within the scope of the present invention.

In the drawings.

DETAILED DESCRIPTION OF THE EMBODIMENTS

The present invention is particularly applicable in the field of housing of laboratory animals, this being the reason whereby the present invention is described below with particular reference to the applications thereof in the field of housing of animals.

It is in any case worth noting that the possible applications of the present invention are not limited to the ones described below. Contrarily, the present invention is conveniently applied in all those case in which optimizing (reducing or containing) the volume, in particular the vertical volume, of a container is required while optimizing (increasing) the free height or maximum inner height of the container itself.

Figure 1:
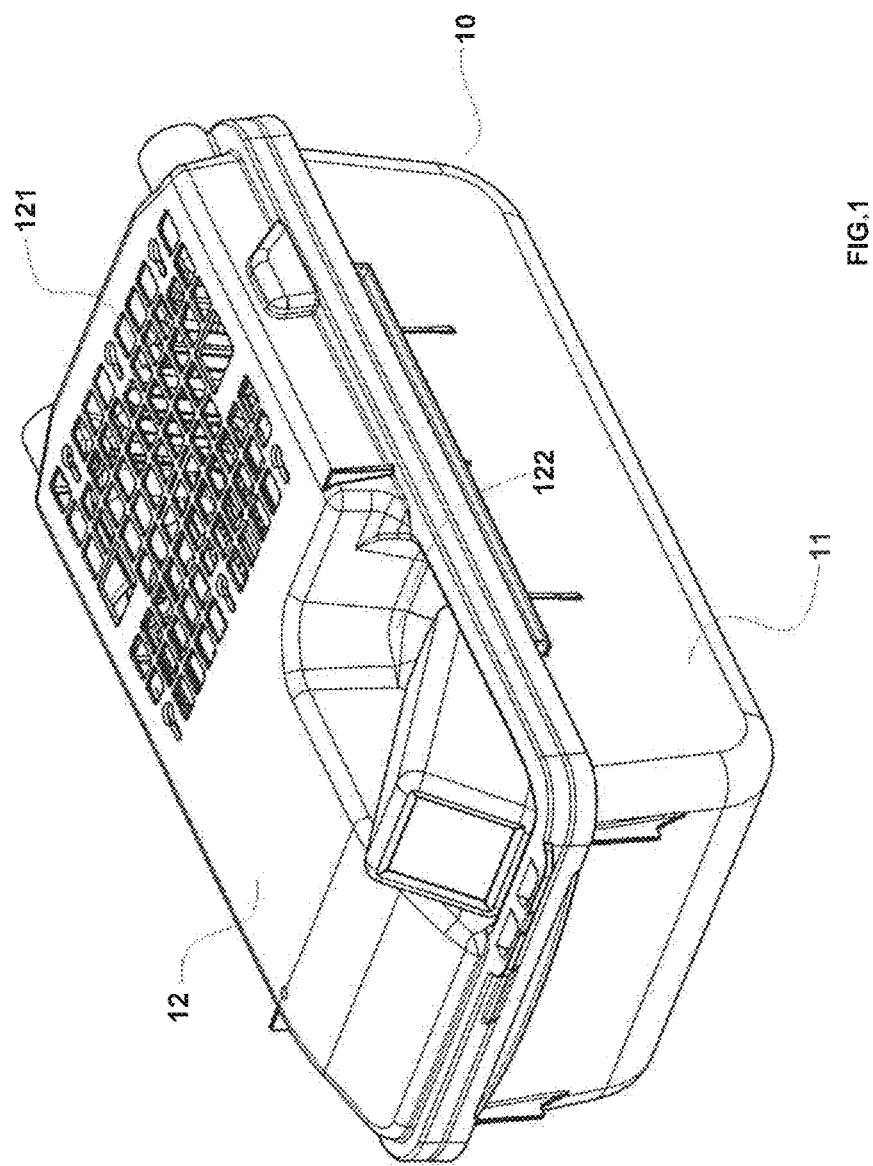
FIG. 1 shows a perspective view of a cage according to an embodiment of the present invention.
Figure 2:
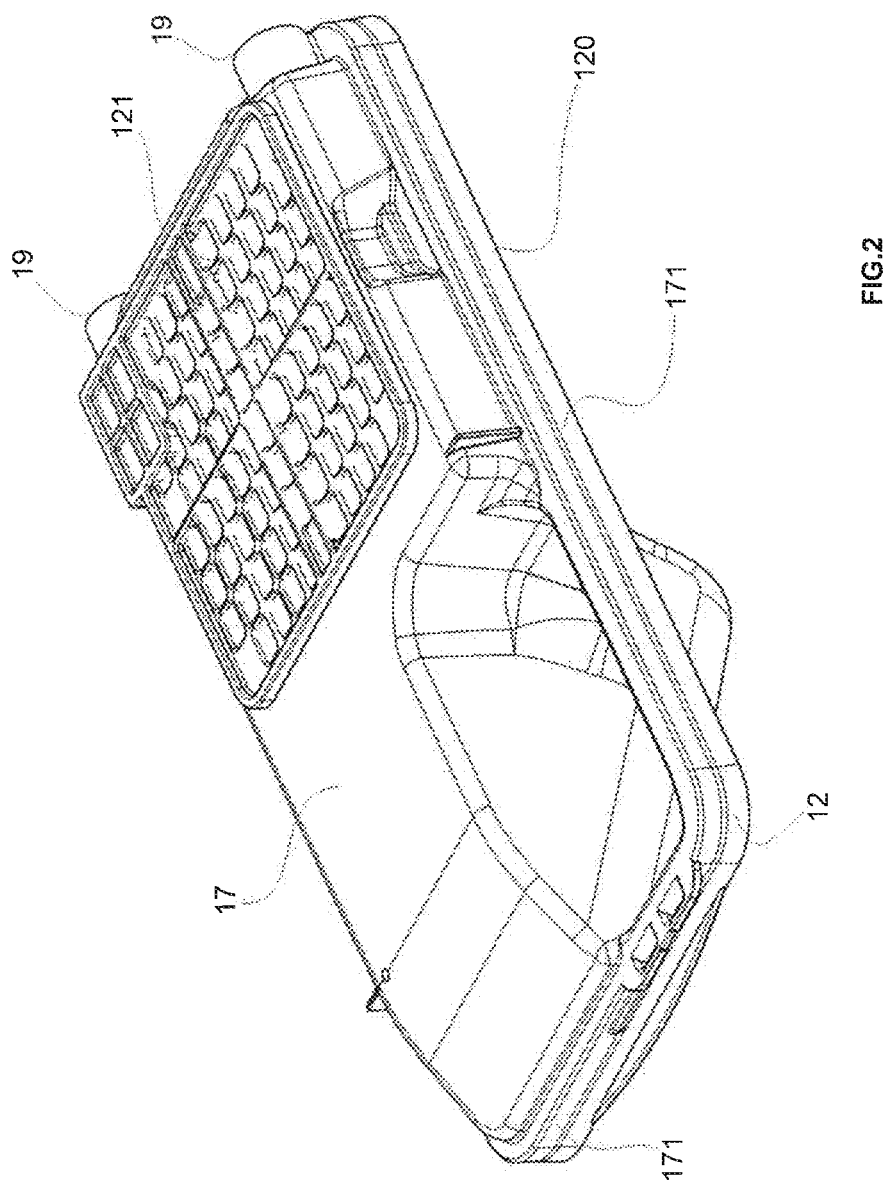
FIG. 2 shows a perspective view of a hood (cover) of a cage according to an embodiment of the present invention.
Figure 3:
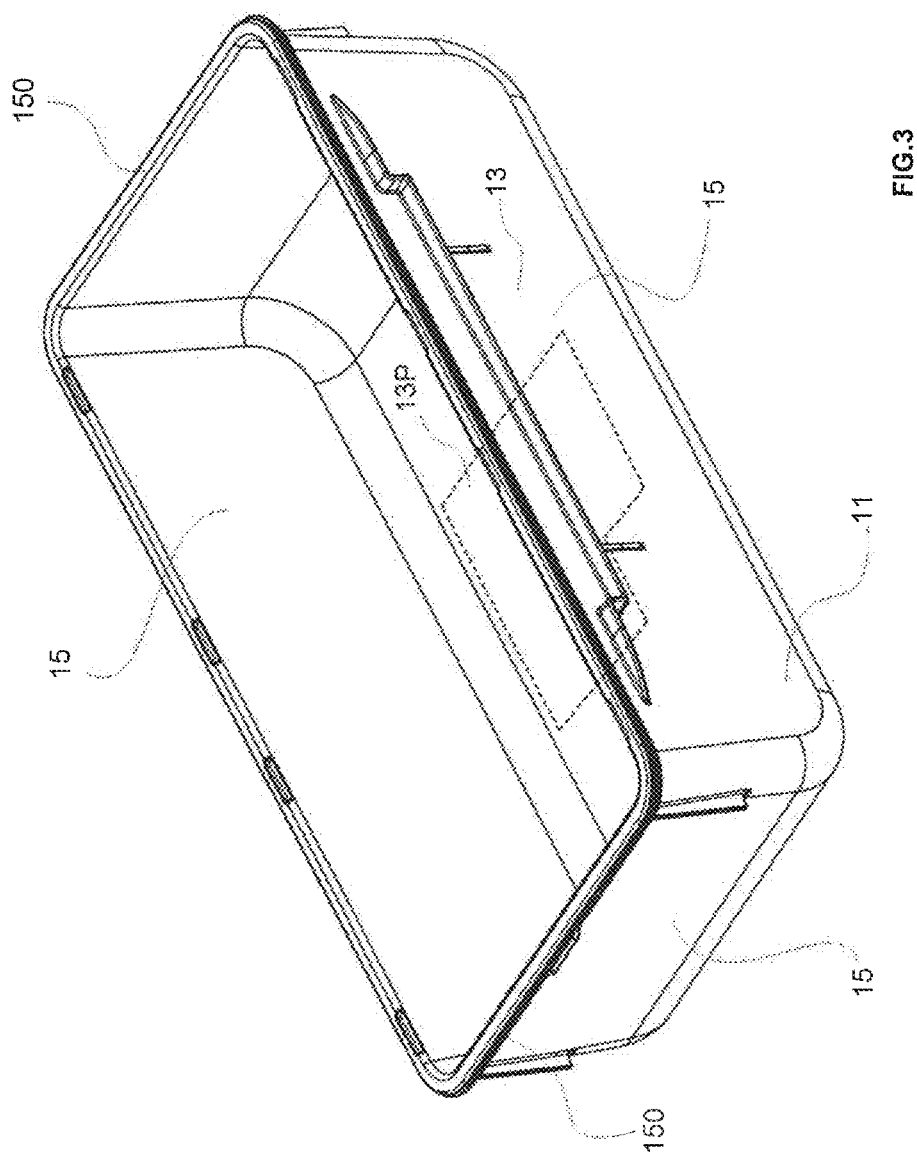
FIG. 3 shows a perspective view of a basin of a cage according to an embodiment of the present invention.

In FIGS. 1 to 3, the cage according to the embodiment of the present invention herein depicted is identified as a whole by numeral 10; as depicted, cage 10 comprises a basin 11 essentially intended to contain the litter for animals to be housed (possibly together with other accessories), wherein the basin 11 defines part of the space available to the animals. Again as depicted, cage 10 comprises a closing hood 12 adapted to be positioned over basin 11 (and possibly fastened thereto by means of fastening means which are not depicted) in the closed position in FIG. 1 (in which it prevents the animals from exiting and also access inside basin 11), and to be removed from basin 11, for example when access to the inside of basin 11 is required by an operator and/or when it is required to perform operations such as for example, changing the litter or similar operations. In compliance with the terminology commonly accepted and used by the operators in the field, hood 12 possibly is also defined below as "cover" or simply "top".

As shown in detail, basin 11 has a box-like shape (and rectangular in the non-limiting example depicted in the drawings) and comprises a substantially flat bottom wall 13 and four side walls 15 in pairs opposed to each other, joined to one another and joined to bottom 13. For reasons of conciseness, reference is indifferently made below to a single side wall 15 or also to the overall side wall 15, as mentioned formed by the four side walls in pairs opposed to each other or also continuous, such as for example in the case of a circular-plan basin 11. For its part, as depicted in FIG. 2, hood 12 comprises a portion or true main cover wall 17 from which a side skirt 171 extends in substantially transverse direction, the skirt giving the hood 12 the shape of a tray and being formed by four side walls reciprocally joined in pairs and each joined to the closing wall 17; as in the case of basin 11, reference possibly is indifferently made below for reasons of brevity to a single side wall 171 or also to the overall side wall 171, as mentioned formed by the four side walls joined in pairs and opposed to each other. According to one embodiment depicted in FIG. 2, hood 12 comprises a grid 121, a depression 122 for housing and positioning a container 80 for drinking liquids, and also air intakes 19 for introducing and discharging ventilated and/or forced air into and from cage 10, respectively. The air intakes 19, as grid 121 and the aforesaid depression 122, are in any case not essential for the purposes of the present invention and therefore a detailed description thereof is omitted for reasons of brevity.

Again as depicted in the drawings (see in particular FIGS. 3 and 6), the side walls 15 of basin 11 are reciprocally joined to define an edge 150, called support edge for reasons which are clarified below.

Moreover, also the side walls 171 of hood 12 are reciprocally joined to define an edge 120, here called engagement edge.

Indeed, with hood 12 positioned over basin 11 as depicted in FIG. 1, and therefore defining the inner space 14 delimited by the basin-hood system or group, thus preventing access to said space 14, the edge 150 of basin 11 and edge 120 of hood 12 are opposed to each other, wherein edge 150 carries hood 12 and therefore is engaged by edge 120.

Figure 4:
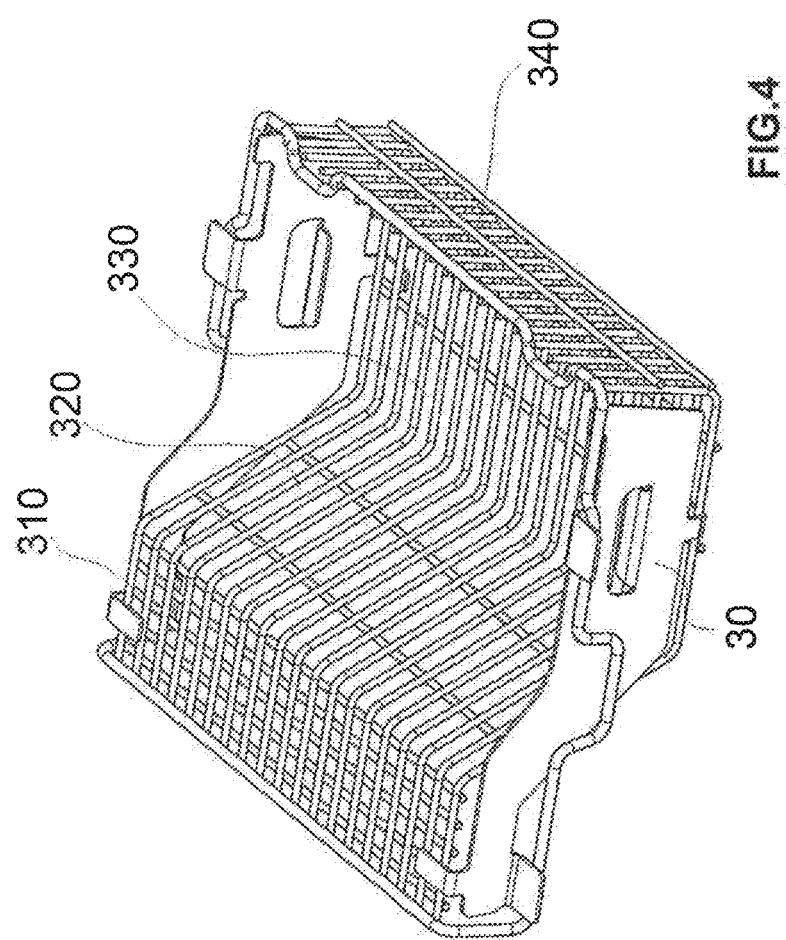
FIG. 4 shows a perspective view of a feeder for a cage according to an embodiment of the present invention.
Figure 5:
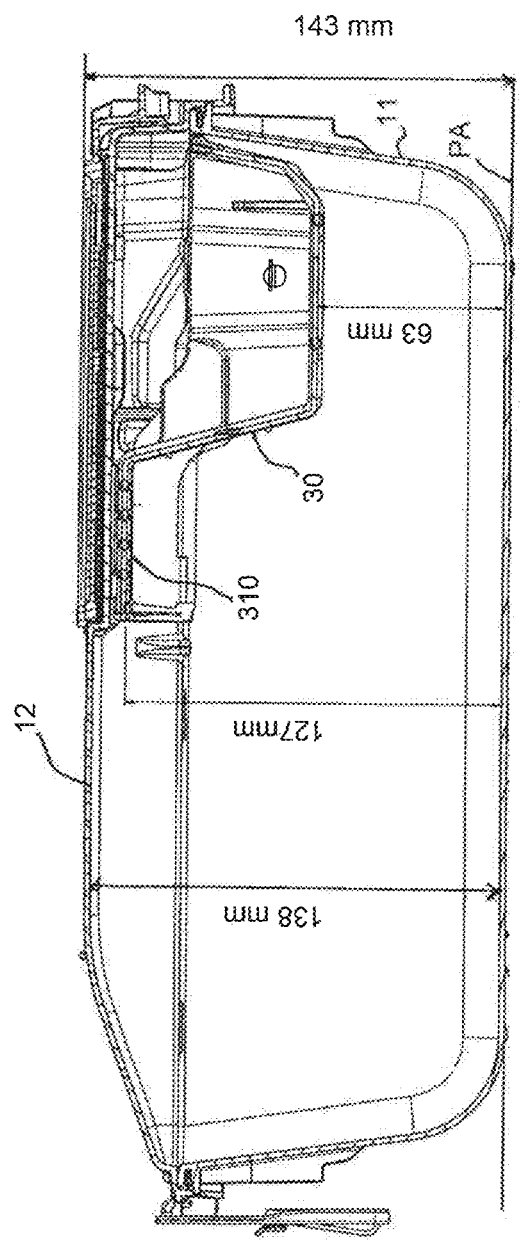
FIG. 5 shows a longitudinal vertical sectional view of a cage according to an embodiment of the present invention.

Concerning feeder 30 in FIG. 4 (and in FIG. 5), the same, which is made for example of metal but also of rigid plastic material and also simply called "lid" (from German Deckel) according to the specific shape, is intended to be positioned in cage 10, for example as depicted in FIG. 5, and is shaped so as to contain and make a feed available for the animals, in particular so that the feed does not come in contact with the litter.

For the purposes of the present invention, which are clarified in greater detail below, feeder 30 comprises a substantially flat upper portion, from which an inclined joining portion 320 extends, which joins the upper flat portion 310 with a lower flat portion 330, wherein the joining portion 320 and the lower flat portion define a housing depression for housing the feed.

Moreover as depicted, the longitudinal extension of the feeder (from right to left and vice versa in FIGS. 4 and 5) is less than the longitudinal extension of hood 12, wherein therefore, at least one portion of the upper cover wall 17 is not "obscured" by feeder 30 (feeder 30 and said at least one portion of the cover wall 17 are not vertically overlapping).

And again, at least the upper flat part 310 and part of the joining portion 320 of feeder 30 are accommodated in hood 12, wherein the depression-shaped portion moreover is arranged adjacent (opposed also if vertically offset) to the air intakes 19 made in hood 12.

The above shape and arrangement of feeder 30 provide the multiple results of: in any case allowing access to the inside of basin 11 (without the need to remove feeder 30); making the air intakes 19 unreachable by the animals (the air intakes 19 being obscured by the depression-shaped portion of feeder 30); not having a negative effect on (not reducing) the free height or minimum height available for the animals, or in other words, allowing the free height or minimum height available for the animals to conform with the housing regulations, at least at a portion 13P (indicated by way of example by means of a dotted line in FIG. 3) which surface is at least equal to 50% of the total floor surface defined by bottom 13.

Again as mentioned above, the cage according to the present invention indeed comprises further peculiarities aiming to contain the vertical volume in compliance with the housing regulations mentioned above and currently in force.

Figure 6:
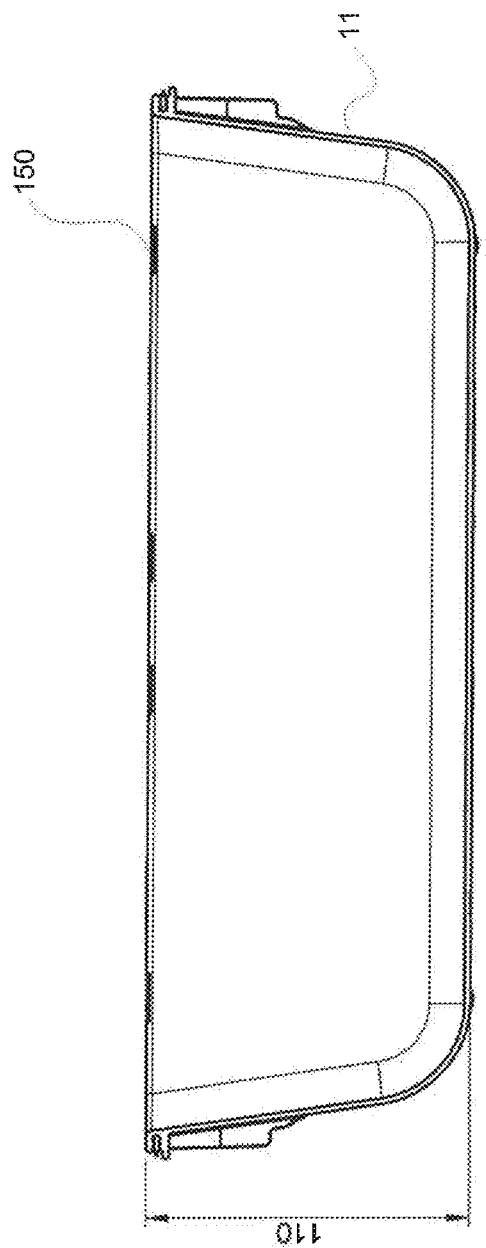
FIG. 6 shows a longitudinal vertical sectional view of a basin of a cage according to an embodiment of the present invention.

A first peculiarity is depicted in FIG. 6, wherein the observation of FIG. 6 allows appreciating that with basin 11 supported on a support plane PA, for example a rack of a housing shelf (not depicted), the maximum distance between edge 150 and plane PA is no greater than 110 mm (corresponding to 4.33 inches) with respect to a height equal to at least 130 mm in the case of cages according to the prior art.

Although hoods 12 having substantially standard sizes are used, this allows the maximum height (the maximum distance between plane PA and the end portion of hood 12 higher up, when positioned over basin 11) to be contained within and not beyond 143 mm (corresponding to 5.63 inches, FIG. 5) with respect to a maximum height equal to 160 mm in the case of the cages according to the prior art.

The above contained height allows positioning up to 12 cages 10 (each including basin 11 and hood 12) in a vertical extension space only slightly larger than 2000 mm, such as defined for example, by a housing shelf or rack, or at least 11 cages in a vertical extension space slightly smaller than 2000 mm (according to the thickness of and the mutual distance between the racks of the shelf), in overlapping position, with a significant improvement with respect to the cages according to the prior art, wherein at most 10 cages according to the prior art can be stored in the same vertical space.

The above measurements ensure that in the case feeder 30, with hood 12 positioned over basin 11, is not used, the minimum free height, i.e. the minimum distance between the inner surface of the cover wall 17 and the inner surface of the bottom wall 13, is much greater than the minimum provided by the regulations at a portion 13P of the bottom wall with surface greater than 50% of the total floor surface—practically in the case depicted—for the whole portion of the bottom wall 13 that falls outside the vertical projection of depression 122.

Moreover, also in the case of use of the lid or feeder 30, given that at least the upper flat portion 310 thereof is accommodated in the space defined by hood 12, and therefore above basin 11, the minimum height available for the animals (the distance between the inner surface of bottom 13 and the lower portion of portion 310 (127 mm in the case depicted)) also at said upper flat portion 310, is in any case greater than or at least equal to the minimum required by the regulations (127 mm).

It has therefore been shown by the detailed description above of the embodiments of the present invention depicted in the drawings, that the present invention allows the desired results to be obtained and the drawbacks affecting the prior art to be overcome or at least limited.

In particular, a cage for housing laboratory animals is made available by means of the present invention, the cage being conceived so as to have a reduced or contained vertical volume, but in which the free height or minimum height available for the animals simultaneously meets the requirements provided by the regulations, in particular at least one portion of the floor surface which is no less than 50% of the total floor surface.

A cage for housing laboratory animals is made available by means of the present invention, the cage being conceived so as to have a reduced or contained vertical volume, but in which the free height or minimum height available for the animals simultaneously meets the requirements provided by the regulations, in particular at at least one portion of the floor surface which is no less than 50% of the total floor surface, and in particular also if an additional component is accommodated inside the case, such as for example, a lid, in particular shaped as a feeder.

Again, the cage according to the present invention is characterized by sufficiently reduced vertical volume so as to allow no less than twelve cages, preferably no less than thirteen cages, to be stored in a vertical space, for example defined by a shelf or rack, in overlapped position, all while complying with the housing regulations.

And again, a cage of the aforesaid type is made available by means of the present invention, the cage having sufficiently reduced vertical volume so as to allow no less than twelve cages, preferably no less than thirteen cages, to be stored in a vertical extension space no larger than 2000 mm, for example defined by a shelf or rack, in overlapped position, always while complying with the housing regulations.

Finally, a housing shelf is made available by means of the present invention, the shelf allowing no less than twelve cages, preferably no less than thirteen cages, in compliance with the housing regulations to be stored in a vertical extension space no larger than 2000 mm.

Although the present invention was clarified above by means of the detailed description of the embodiments thereof depicted in the drawings, the present invention is not limited to the embodiments described and depicted in the drawings; contrarily, all those variants and/or modifications of the embodiments described and depicted in the accompanying drawings, which are clear and obvious to those skilled in the art, fall within the scope of the present invention.

The scope of protection of the present invention is therefore defined by the claims.

We claim:

1. A cage for housing laboratory animals, said cage comprising:
    a basin and a hood which is configured for removable attachment on said basin, wherein said hood and said basin, with said hood positioned over said basin, define an inner space, which is closed and not accessible from the outside, wherein said basin comprises a substantially flat bottom wall and a plurality of side walls, each joined to said bottom wall and reciprocally joined in pairs to define a first support edge, wherein said hood is in the shape of a tray to define a second engagement edge and comprises a main cover wall,
    wherein, with said hood positioned over said basin so as to prevent said inner space from being accessed, said first support edge and second engagement edge are opposed to each other;
    wherein the cage comprises a feeder lid positioned in said inner space, said feeder lid comprising a planar upper portion from which a joining portion extends downwardly, which joins the planar upper portion with a lower portion, and
    wherein said lower portion projects into the basin, and at least said planar upper portion and part of said joining portion of said feeder lid project above the first support edge of the basin and are accommodated by the hood.

2. The cage according to claim 1, wherein with said basin positioned over a support plane and with said hood positioned over said basin so as to prevent said inner space from being accessed, the maximum distance between the outer surface of said main cover wall and said support plane is no greater than 143 millimeters (mm).

3. The cage according to claim 1, wherein said lower portion that projects into the basin has a minimum vertical height above the substantially flat bottom wall of at least 63 mm which is available for said laboratory animals.

4. The cage according to claim 1, wherein said hood comprises a plurality of side walls each joined to said main cover wall and reciprocally joined in pairs to define said second engagement edge and give said hood said tray shape.

5. The cage according to claim 1, wherein said basin and said hood have a substantially rectangular plan shape.

6. The cage according to claim 1, wherein said hood defines at least one depression adapted to accommodate, outside said inner space, a container for providing drinking liquids to said animals.

7. The cage according to claim 1, wherein said hood defines at least two air intakes for introducing into, and discharging from, said inner space ventilated and/or forced air, respectively.

8. The cage according to claim 1, wherein said hood defines at least one grid-shaped portion.

9. A shelf for housing laboratory animals, wherein said shelf is shaped so as to contain a plurality of housing cages stacked in a vertical space, wherein said shelf comprises at least ten housing cages according to claim 1, said at least ten housing cages being arranged in said vertical space so that projections on a transverse plane of said at least ten cages substantially coincide, and no portion of the highest cage exceeds more than 2000 mm from the ground beneath the plurality of stacked housing cages.

10. The cage according to claim 1, wherein the minimum vertical height between said upper flat part of said feeder lid and said bottom wall of the basin is no less than 127 mm.

11. The cage according to claim 1, wherein the longitudinal extension of said feeder lid is less than the longitudinal extension of the hood.

12. The cage according to claim 1, wherein said first support edge comprises a peripheral gasket which projects towards and contacts said second engagement edge when said hood is positioned over said basin.

13. The cage according to claim 1, wherein with said basin positioned over a support plane, the maximum distance between said first support edge and said support plane is less than or at most equal to 110 mm, and in that, at a portion of said bottom wall the surface of which is equal to at least 50% of the floor surface of said bottom wall, the minimum vertical height which is available for said laboratory animals is no less than 127 mm.

* * * * *